3,091,470
PRESSURE LOADED BONNET ASSEMBLY
Clifford E. Anderson and Louis F. Eckert, Jr., Houston, Tex., assignors to ACF Industries, Incorporated, New York, N.Y., a corporation of New Jersey
Filed July 1, 1960, Ser. No. 40,417
10 Claims. (Cl. 277—73)

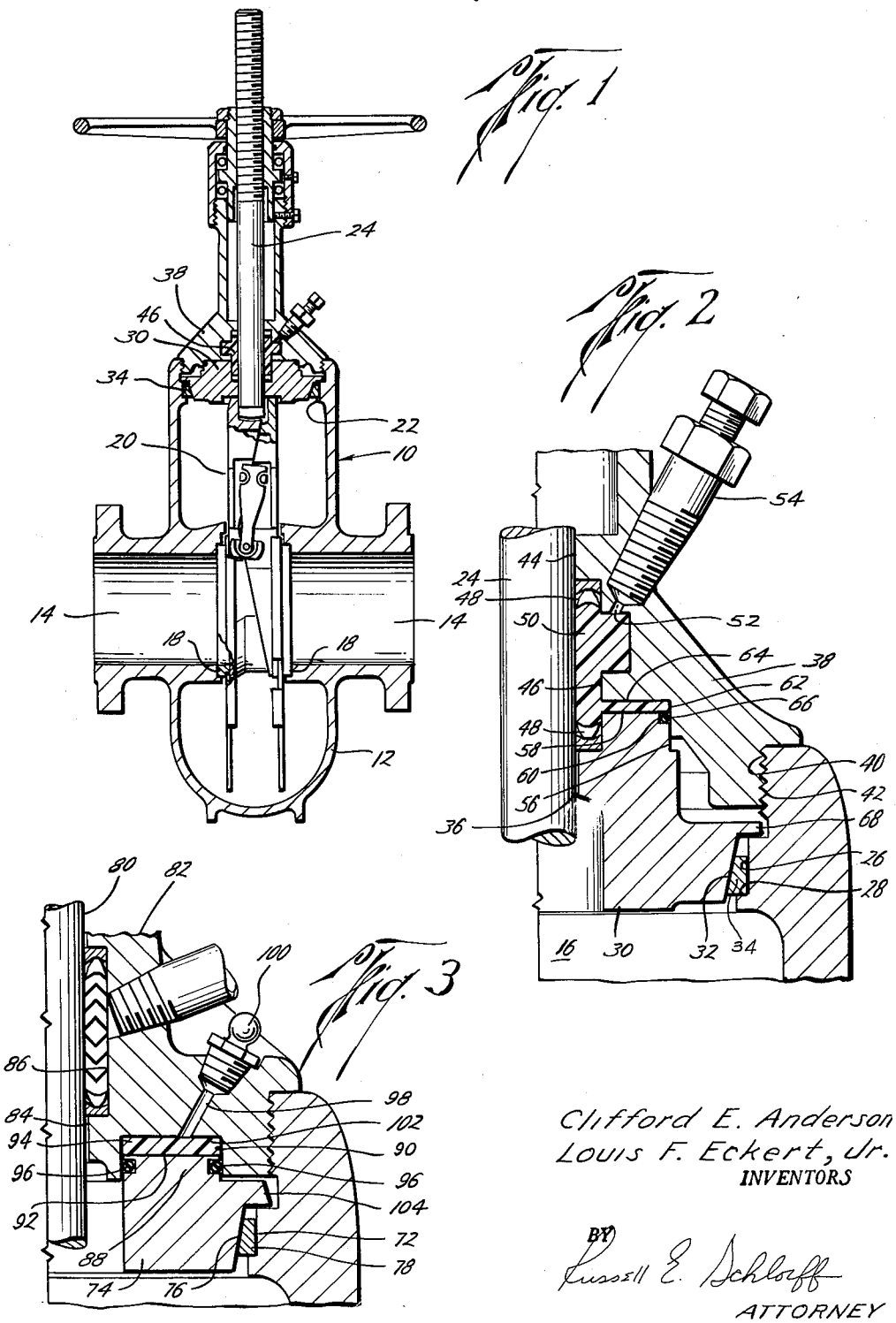

This invention relates generally to a closure assembly for pressure vessels and more particularly to a bonnet assembly for valves having a pressure actuated seal ring in which the initial seal for the seal ring is obtained by a hydraulic pressure exteriorly applied.

Most valves have an open ended valve chamber. The opening to this chamber is closed by a disengageable bonnet which permits entry into the chamber to make necessary repairs to the valve mechanism. Many other pressure vessels have similar openings when entrance into the interior thereof must be available. While the most common method of closing this opening has been to have a flanged bonnet bolted to a flange around the opening with suitable means between the flanges of body and bonnet to effect a seal, such method is relatively expensive to manufacture and time consuming to assemble and disassemble. Moreover, if a metallic seal ring is used, it is necessary to use high tensile strength bolts which must be tightened evenly and torqued sufficiently to actually deform the ring.

In place of the flanged type closure assembly, some valves use a pressure actuated type closure assembly in which a bonnet is inserted in the opening and a metallic ring, which is pressure actuated, is interposed between the wall of the opening and the bonnet. This assembly has the advantage of being easier to assemble; however, certain types develop extremely high hoop stresses requiring a large mass surrounding the wall of the opening. Other types required precise measurements with tight tolerances which are difficult to manufacture on a day-to-day basis. Some, particularly when the opening involved is large in diameter, are difficult to tighten sufficiently so that an initial seal is obtained. If screw threads are used to provide the initial loading means for the pressure actuated type seal of large diameters, the efficiency of the threads is so low that an excessive amount of torque is required to obtain the necessary load to effect an initial seal. Moreover, in most pressure actuated type closure assemblies it is necessary to have precise concentricity of all the parts involved which is extremely difficult to obtain with normal shop practices.

The present invention is directed to a closure assembly having a pressure actuated seal ring which is economical to manufacture and easy to assemble and which does not develop high hoop stresses. The wall of the opening of the pressure vessel or a valve body is machined to provide a sealing surface. The closure member is provided with a peripheral sealing surface. Between the sealing surface of the closure member and the sealing surface of the wall of the opening a metallic seal ring is interposed. The seal ring has surfaces corresponding to the adjacent walls of the opening and closure member. The independent retaining means is detachably secured in the opening axially outward of the sealing surface. If the closure assembly is for a valve, suitable means are provided to seal around the stem that normally projects through the bonnet. The retaining means acts simply as a holding means for the closure member and does not apply any load directly to the closure member. The retaining means is provided with a fixture which permits application of plastic packing from the exterior. This plastic packing acts on the closure member and applies a hydraulic load on the closure member forcing it axially inward to mash the seal ring into intimate contact with the wall of the opening and closure member to establish the initial seal. The closure member may be provided with means to limit its axial inward movement. The relationship of the closure member and retaining means is so proportioned that in the event of loss of the packing material the closure member can move up only the distance it took to establish the initial seal, which is not sufficient to permit the seal ring from becoming disengaged from its position between the wall of the opening and the closure member since the ring will float up due to the internal pressure in the body such distance and still maintain its seal.

It is the object of the present invention to provide a closure assembly having a pressure actuated seal ring provided with an independent retaining means to retain the closure member in the opening whereby the necessity of precise concentricity of all elements is substantially reduced.

It is another object to provide a closure assembly having a pressure actuated seal ring which is economical to manufacture and easy to assemble.

It is a further object to provide a closure assembly having a pressure actuated seal ring provided with an independent retaining means for the closure member and an external means of applying initial load to the seal ring of the closure assembly.

It is still a further object to provide a closure assembly having a pressure actuated seal ring with an independent retaining means and independent loading means to apply initial sealing load on the seal ring in which the amount of load is limited.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein:

FIG. 1 is a vertical section of a valve having a closure assembly of the present invention.

FIG. 2 is an enlarged fragmentary portion showing details of the closure assembly.

FIG. 3 is a view similar to FIG. 2 showing an alternate form of closure assembly.

Referring now to the drawings, there is illustrated a valve 10 having incorporated therein the closure assembly of the present invention. The closure assembly may be incorporated in any type of pressure vessel having an opening which is closed by a disengageable closure. The invention does not relate specifically to the nature or purpose of the pressure vessel, but to a means for effecting the closure of an opening in such a pressure vessel.

The valve 10 has a body 12 having a flow passage 14 therethrough which is interrupted by an open-ended valve chamber 16. A valve seat 18 surrounds the flow passage 14 at each side of the valve chamber 16. Positioned in the valve chamber 16 is a valve member 20 which cooperates with the valve seats 18 to control the flow of fluid through the flow passage 14.

The valve chamber 16 has an opening 22 through which the valve seats 18 and valve member 20 are inserted. The opening 22 is closed by a removable bonnet assembly through which a stem 24 attached to the valve member 20 extends. Rotation of the stem 24 causes the valve member 20 to move to either block flow through the flow passage 14 or permit flow therethrough. The valve seats 18 and valve member 20 are initially inserted through the opening 22 and it is desirable that entrance can be obtained subsequently to repair or renew the valve seats 18 and valve member 20; therefore, it is necessary that the bonnet assembly closing the opening 22 be removable. However, during the operation of the valve it is essential that the opening 22 be tightly closed so that no fluid flowing through the valve can escape to the atmosphere. It is the removable bonnet assembly with which the present invention is primarily concerned.

To form the bonnet assembly, the opening is machined to provide a sealing surface 26 which in the drawing is shown as a cylindrical surface. However, if a different type of seal ring is used in place of the ring illustrated, the sealing surface will be correspondingly changed to adapt for such seal ring. Axially inward of the cylindrical surface 26 the wall of the opening is of a reduced diameter whereby a shoulder 28 is formed between the axial inner end of the cylindrical surface 26 and the reduced diameter of the opening. Positioned in the opening is a closure member 30 having an inwardly tapered surface 32 which is opposed to the cylindrical surface 26. A pressure actuatable type seal ring 34 is positioned between the tapering surface 32 of the closure member 30 and the cylindrical surface 26 of the opening. The seal ring 34 is insertable through the opening 22 and has surfaces which correspond to the surfaces 32 of the closure member and cylindrical wall 26 which it opposes. The closure member 30 is provided with a centrally located passage 36 through which the stem 24 extends.

To retain the closure member 30 in position as the internal pressure in the valve chamber 16 exerts force on the seal ring 34 tending to force the seal ring 34 between the tapered surface 32 and cylindrical surface 26, a retainer member 38 is removably secured in the opening 22 axially outward of the closure member 30.

The retainer member 38 also provides means through which axially inward force can be exerted upon the closure member to establish an initial seal between the seal ring and its mating surfaces as will be explained subsequently. In order to removably secure the retainer member 38 in the opening 22, the wall of the opening axially outward of the cylindrical surface is provided with female threads 40 and the outer periphery of the retainer member is correspondingly provided with male threads 42. The two sets of threads are threadedly engaged to attach the retainer member 38 in the opening. The retainer member 38 may have a shoulder overlying the top of the body which will limit the inward movement of the retainer member 38. The retainer member, like the closure member, is provided with a passage 44 through which the stem 24 extends. Coaxial with the passages through the closure member and retainer member there is a recess 46 of slightly greater diameter than the passage. A portion of the recess 46 is in the closure member 30 and a portion is in the retainer member 38. The recess 46 forms a stuffing box to provide means to seal between the stem 24 and the passages 36 and 44. To effect this seal, a set of chevron rings 48 is positioned in each end of the stuffing box 46. Supplementing the chevron ring sets 48 is plastic packing 50 which is between the chevron rings 48—48. To introduce the plastic packing 50 into the stuffing box 46, there is a passage 52 extending through the retainer member 38 and communicating with the stuffing box 46 and exterior. Positioned in the passage 52 is a packing fitting 54 through which the packing 50 can be introduced.

The outer end of the closure member 30 has a generally cylindrical portion 56 terminating in an outer annular surface 58. A notch 60 is formed in the outer periphery of the annular surface 58. The retainer member 38 is provided with a cylindrical portion 62 which is proportioned to telescope over the cylindrical portion 56 of the closure member 30. The end of the retainer member has a surface 64 which generally opposes the outer annular surface 58 of the closure member 30. Positioned in the notch 60 is an O-ring seal 66. After initial tightening of the retainer member 38, there will be a space between the opposed surfaces 58—64 of the closure member and retainer member. Since the retainer means 38 is held stationary in the opening 22 by its threaded engagement, the injection of plastic packing 59 through the fitting 52 will, after filling the stuffing box 46, flow between the surfaces 58 and 64 until it is stopped by the O-ring seal 66. Further introduction of plastic packing 50 will cause a pressure to build up between the surfaces 58 and 64 causing the closure member 30 to move axially inward putting pressure between the sealing ring 34 and its mating surfaces. Due to the fact that the tapering surface 32 projects through the sealing ring 34 and the taper of the inward projecting surface 32 is at a relatively small angle to the longitudinal axis of the opening 22, it will be evident that the seal ring 34 will be positively expanded as the closure member 30 is forced axially inward. This will tend to form a fluid type seal between the inner face of the seal ring 34 and the inwardly tapering surface 32 of the closure member 30 and between the outer face of the seal ring 34 of the cylindrical surface 26 of the opening. At the same time, it will tend to hold the seal ring 34 downwardly upon the shoulder 28. This will produce an initial seal so that further internal pressure from the valve chamber will act upon the bottom face of the seal ring 34 causing it to move further up into the space between the inwardly tapering surface and the cylindrical surface to form even a tighter seal. In order to prevent an excessive initial load being produced upon the seal ring 34, the closure member 38 is provided with an annular shoulder 68 which is of a greater diameter than cylindrical surface 26 and overlies it. Therefore, after the closure member has moved a sufficient amount inward to form the initial seal, all further inward movement is arrested.

Since it is not necessary for the retainer means 38 to put a load on the closure member 30, it is not necessary for the threads 40 and 42 to be of such construction as to be load applying, therefore, they can be rather loose to permit easy assembly. If desired, instead of using the threads 40—42, it is possible to utilize other means to form a connection between the retainer member 38 and opening such as a bayonet type holding assembly which is also easy to assemble. This means of assembly is especially important on large size valves or pressure vessels where the opening may be 20" or more in diameter. If load applying threads are used, the amount of torque to turn the retainer means 38 is exceedingly high. By the use of the present construction, the bonnet assembly can be easily assembled and after the assembly is completed the load to establish the initial seal of the sealing ring can be accomplished by the addition of plastic packing 50 which will properly load the sealing ring 34 to establish the initial seal.

If a leak develops whereby the plastic packing 50 is dissipated, the closure assembly will still hold since the seal ring 34 does not depend upon the downward thrust of the packing for any seal except the initial seal. Once the initial seal has been established, the internal pressure in the valve chamber 16 will maintain the seal. The amount of upward movement resulting from loss of plastic packing is not sufficient to permit the extrusion of the sealing ring 34, and if the closure member is permitted to move axially outward due to the loss of packing the internal pressure on the sealing ring 34 will cause it to follow along.

FIG. 3 shows an alternate form of construction whereby instead of using the plastic fitting from the stuffing box to apply the hydraulic pressure on the closure member there is an independent packing system for applying pressure to the closure member. As can be seen, the construction of the bonnet assembly, shown in FIG. 3, except for the above distinction and the necessary alterations because of it is quite similar to that shown in FIGS. 1 and 2. The opening is provided with a cylindrical surface 72. A closure member 74 having an inwardly tapering surface 76 is opposed to the cylindrical surface 74. Interposed between the cylindrical surface 72 and the inwardly tapering surface 76 is a seal ring 78. The closure member 74 has an opening through which a stem 80 extends. To retain the closure member 74 in operative position, there is a retainer member 82 which is detachably secured to the opening axially outward of the cylindrical surface 72. The retainer member 82 has a passage 84 for the stem 80 and a stuffing box 86 to provide a seal between the passage 84 and stem 80.

The axial outer end 88 of the closure member 74 is generally cylindrical and the retainer member 82 is provided with a recess 90 to receive the cylindrical end portion 88 of the closure member. To facilitate assembly, the edges of the recess 90 of the retainer member 82 may have a slight bevel. When assembled the closure member 74 and retainer member 82 have spaced opposed surfaces 92—94. The surface of the outer cylindrical end portion 88 has annular grooves in which are positioned O-rings 96. This construction in effect produces a piston assembly. Communicating with the space between the opposed surfaces 92—94 there is a passage 98 in the retainer member 82 which extends to the exterior. Positioned in the passage 98 is a fitting 100 which permits the introduction of pressurizing medium 102, such as plastic packing, grease, or any hydraulic or pneumatic medium. The pressurizing medium 102 causes the closure member 74 to move axially inward establishing an initial seal between the sealing ring 78 and its mating surfaces as previously described. To limit the amount of axial inward movement of the closure member 74, there is a shoulder 104 which overlies the cylindrical surface 72.

As can be seen from the above, the invention provides a closure assembly having a pressure actuated seal ring which is easy to manufacture and assemble since the initial loading of the seal ring does not depend upon generating mechanical force with the retainer means, but is independently provided by the hydraulic action of pressurizing medium.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What is claimed is:

1. A closure assembly for a pressure vessel comprising a pressure vessel having a circular opening, a portion of the wall of the opening forming a sealing surface, a closure member having a sealing surface positioned in the opening with the sealing surface opposed to the cylindrical surface, a pressure actuated metal sealing ring positioned between the sealing surface of the closure member and the sealing surface of the opening, retaining means disengageably secured to the wall of the opening axially outward of the sealing surface, said closure member and said retaining means having spaced opposed surfaces, means forming a seal about the periphery of said opposed surfaces, a passage in the retaining means communicating with the space between said opposed surfaces, means in said passage to permit the injection of a pressurizing medium from the exterior to said space to force the closure member axially inward forming an initial seal between the sealing ring and the surfaces it contacts.

2. A closure assembly for a pressure vessel comprising a pressure vessel having a circular opening, a portion of the wall of the opening forming a sealing surface, a closure member having a sealing surface positioned in the opening with the sealing surface opposed to the cylindrical surface, a pressure actuated metal sealing ring positioned between the sealing surface of the closure member and the sealing surface of the opening, retaining means disengageably secured to the wall of the opening axially outward of the sealing surface, said closure member and said retaining means having spaced opposed surfaces, means forming a seal about the periphery of said opposed surfaces, a passage in the retaining means communicating with the space between said opposed surfaces, means in said passage to permit the injection of a pressurizing medium from the exterior to said space to force the closure member axially inward forming an initial seal between the sealing ring and the surfaces it contacts, and means attached to said closure member to limit the amount of axial inward movement of said closure member.

3. A closure assembly for a pressure vessel comprising a pressure vessel having a circular opening, sealing surfaces in the wall of said opening, a closure member positioned in said opening having a sealing surface opposing the sealing surface of the opening, a pressure actuatable metal seal ring interposed between said closure member and the sealing surface of said opening, a retainer member disengageably secured to the walls of the opening axially outward of the seal ring, said closure member and said retainer member having spaced opposed surfaces, means forming a seal about the periphery of said opposed surfaces, a passage in the retainer member communicating with the space between said opposed surfaces, means in said passage to permit the injection of a pressurizing medium from the exterior to said space to force the closure member axially inward to form an initial seal between the seal ring and the surfaces it contacts.

4. A closure assembly for a pressure vessel comprising a pressure vessel having a circular opening, a portion of the wall of the opening providing a cylindrical surface, a portion of the wall axially inward of the cylindrical surface being of a reduced diameter thereby forming a shoulder at the axial inward end of the cylindrical surface, a closure member having an inwardly tapering surface positioned in the opening with the inwardly tapering surface opposed to the cylindrical surface, a pressure actuated metal seal ring positioned between the tapering surface of the closure member and the cylindrical surface of the opening, retaining means disengageably secured to the wall of the opening axially outward of the cylindrical surface, a passage in the retaining means communicating with an axial outer surface of the closure member, means in said passage to permit the injection of a pressurized medium from the exterior to the axial outer surface of the closure member to force the closure member axially inward forming an initial seal between the sealing ring and the surfaces it contacts.

5. A closure assembly for a pressure vessel comprising a pressure vessel having a circular opening, a portion of the wall of the opening providing a cylindrical surface, a portion of the wall axially inward of the cylindrical surface being of a reduced diameter thereby forming a shoulder at the axial inward end of the cylindrical surface, a closure member having an inwardly tapering surface positioned in the opening with the inwardly tapering surface opposed to the cylindrical surface, a pressure actuated metal sealing ring positioned between the tapering surface of the closure member and the cylindrical surface of the opening, retaining means disengageably secured to the wall of the opening axially outward of the cylindrical surface, said closure member and said retaining means having spaced opposed surfaces, means forming a seal about the periphery of said opposed surfaces, a passage in the retaining means communicating with the space between said surfaces, means in said passage to permit the injection of a plastic packing from the exterior to said space to force the closure member axially inward forming an initial seal between the sealing ring and the surfaces it contacts.

6. A closure assembly for a pressure vessel comprising a pressure vessel having a circular opening, a portion of the wall of the opening providing a cylindrical surface, a portion of the wall axially inward of the cylindrical surface being of a reduced diameter thereby forming a shoulder at the axial inward end of the cylindrical surface, a closure member having an inwardly tapering surface positioned in the opening with the inwardly tapering surface opposed to the cylindrical surface, a pressure actuated metal sealing ring positioned between the tapering surface of the closure member and the cylindrical surface of the opening, retaining means disengageably secured to the wall of the opening axially outward of the cylindrical surface, said closure member and said retaining means having spaced opposed surfaces, means forming a seal about the periphery of said opposed surfaces, a passage in the retaining means communicating with the space between said surfaces, means in said passage to permit the injection of a plastic packing from the exterior to said space to force the closure member axially inward forming an initial seal between the sealing ring and the surfaces it contacts, and means attached to said closure member to limit the amount of axial inward movement of said closure member.

7. A bonnet assembly for a valve comprising a valve body having an open ended valve chamber, a portion of the wall of the open end of the valve chamber being provided with a cylindrical surface, a portion of the wall axially inward of the cylindrical surface being of reduced diameter thereby forming a shoulder with the axial inner end of the cylindrical surface, a closure member having an inwardly tapering surface positioned in the opening with the inwardly tapering surface opposed to the cylindrical surface, a pressure actuated metal sealing ring positioned between the tapering surface of the closure member and the cylindrical surface of the opening, a central passage extending through the closure member, a valve operating stem passing through said passage, a retainer member for said closure member disengageably secured to the wall of the opening axially outward of the cylindrical surface, a stuffing box in the closure member about said stem, a passage in said retainer member communicating with said stuffing box, means in said passage permitting the injection of plastic packing from the exterior to said stuffing box, a passage from said stuffing box to an axially outer surface of the closure member permitting said packing to contact said axial outer surface of said closure member to force the closure member axially inward forming an initial seal between the sealing ring and the surfaces it contacts.

8. A bonnet assembly for a valve comprising a valve body having an open ended valve chamber, a portion of the wall of the open end of the valve chamber being provided with a cylindrical surface, a portion of the wall axially inward of the cylindrical surface being of reduced diameter thereby forming a shoulder with the axial inner end of the cylindrical surface, a closure member having an inwardly tapering surface positioned in the opening with the inwardly tapering surface opposed to the cylindrical surface, a pressure actuated metal sealing ring positioned between the tapering surface of the closure member and the cylindrical surface of the opening, a central passage extending through the closure member, a valve operating stem passing through said passage, a retainer member for said closure member disengageably secured to the wall of the opening axially outward of the cylindrical surface, a stuffing box in the closure member about said stem, a passage in said retainer member communicating with said stuffing box, means in said passage permitting the injection of plastic packing from the exterior to said stuffing box, said closure member and said retainer member having spaced opposed surfaces, means forming a seal about the periphery of said surfaces, a passage from said stuffing box to the space between said opposed surfaces permitting said packing to enter said space to force the closure member axially inward forming an initial seal between the sealing ring and the surfaces it contacts.

9. A bonnet assembly for a valve comprising a valve body having an open ended valve chamber, a portion of the wall of the open end of the valve chamber being provided with a cylindrical surface, a portion of the wall axially inward of the cylindrical surface being of reduced diameter thereby forming a shoulder with the axial inner end of the cylindrical surface, a closure member having an inwardly tapering surface positioned in the opening with the inwardly tapering surface opposed to the cylindrical surface, a pressure actuated metal sealing ring positioned between the tapering surface of the closure member and the cylindrical surface of the opening, a central passage extending through the closure member, a valve operating stem passing through said passage, a retainer member for said closure member disengageably secured to the wall of the opening axially outward of the cylindrical surface, a stuffing box in the closure member about said stem, a passage in said retainer member communicating with said stuffing box, means in said passage permitting the injection of plastic packing from the exterior to said stuffing box, said closure member and said retainer member having spaced opposed surfaces, means forming a seal about the periphery of said surfaces, a passage from said stuffing box to the space between said opposed surfaces permitting said packing to enter said space to force the closure member axially inward forming an initial seal between the sealing ring and the surfaces it contacts, and means attached to said closure member to limit the amount of axial inward movement of said closure member.

10. A bonnet assembly for a valve comprising a valve body having an open ended valve chamber, a portion of the wall of the open end of the valve chamber being provided with a cylindrical surface, a portion of the wall axially inward of the cylindrical surface being of reduced diameter thereby forming a shoulder with the axial inner end of the cylindrical surface, a closure member having an inwardly tapering surface positioned in the opening with the inwardly tapering surface opposed to the cylindrical surface, a pressure actuated metal sealing ring positioned between the tapering surface of the closure member and the cylindrical surface of the opening, a central passage extending through the closure member, a valve operating stem passing through said passage, a retainer member for said closure member disengageably secured to the wall of the opening axially outward of the cylindrical surface, a stuffing box in the closure member about said stem, said closure member and retainer member having spaced opposed surfaces, means forming a seal about the periphery of said surfaces, a passage in said retainer member having means permitting the injection of plastic packing from the exterior to space permitting said packing to enter said axial space to force the closure member axially inward forming an initial seal between the sealing ring and the surfaces it contacts.

References Cited in the file of this patent
UNITED STATES PATENTS
2,810,592    Williams _____ Oct. 22, 1957